(12) United States Patent
Jiang

(10) Patent No.: US 8,074,366 B2
(45) Date of Patent: *Dec. 13, 2011

(54) SENSOR AND METHOD FOR MOTION MEASUREMENT OF CO-EXISTING TILT AND HORIZONTAL ACCELERATION

(76) Inventor: Shu-Sheng Jiang, Mesa, AZ (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/625,333

(22) Filed: Nov. 24, 2009

(65) Prior Publication Data

US 2011/0119942 A1    May 26, 2011

(51) Int. Cl.
    *G01C 9/12*     (2006.01)
    *G01P 15/12*     (2006.01)

(52) U.S. Cl. .................. 33/391; 33/366.12

(58) Field of Classification Search ............ 33/391, 33/366.12, 366.24
See application file for complete search history.

(56) References Cited

U.S. PATENT DOCUMENTS

| | | | |
|---|---|---|---|
| 5,148,604 A * | 9/1992 | Bantien | 33/366.12 |
| 5,279,040 A | 1/1994 | Kippelt et al. | |
| 5,708,206 A * | 1/1998 | Anderson et al. | 73/514.21 |
| 5,739,431 A * | 4/1998 | Petri | 33/365 |
| 5,886,260 A * | 3/1999 | Anderson et al. | 73/514.21 |
| 6,282,804 B1 * | 9/2001 | Jiang | 33/366.21 |
| 6,470,580 B1 * | 10/2002 | Ushihara et al. | 33/366.24 |
| 6,799,459 B2 | 10/2004 | Dosch et al. | |
| 7,325,322 B2 * | 2/2008 | Fulks et al. | 33/366.24 |
| 7,360,419 B2 | 4/2008 | French et al. | |
| 7,444,867 B2 * | 11/2008 | Brett et al. | 73/382 R |
| 2002/0092352 A1 | 7/2002 | Foote | |
| 2005/0016005 A1 * | 1/2005 | Voecks | 33/344 |
| 2005/0198846 A1 * | 9/2005 | Nagata | 33/366.11 |
| 2007/0214886 A1 * | 9/2007 | Sheynblat | 73/509 |
| 2010/0070193 A1 * | 3/2010 | Solinsky | 702/19 |
| 2011/0119942 A1 * | 5/2011 | Jiang | 33/391 |
| 2011/0120220 A1 * | 5/2011 | Jiang | 73/514.12 |
| 2011/0208444 A1 * | 8/2011 | Solinsky | 702/41 |

OTHER PUBLICATIONS

Zing, Yizi, An Electronic Spirit Level Tilt Sensor, Ph.D. Thesis, Technical University of Delft, Netherlands, Feb. 28, 1989, whole document, especially pp. 7-9.
Forward, Robert L., Gravity Sensors and the Principle of Equivalence, IEEE Transactions on Aerospace and Electronic Systems, Jul. 1981, vol. AES-17, No. 4, pp. 511-519. IEEE.

* cited by examiner

*Primary Examiner* — Yaritza Guadalupe-McCall
(74) *Attorney, Agent, or Firm* — Keith L. Jenkins, Registered Patent Attorney, LLC; Keith L. Jenkins

(57) ABSTRACT

A motion-sensing device for sensing tilt and acceleration when either tilt, horizontal acceleration, or tilt and horizontal acceleration acting concurrently, influence the device, including: a substrate, a first tilt sensor fixed to the top of the substrate; a pendulum flexibly coupled to the bottom of the substrate proximate to the first tilt sensor; and a second tilt sensor fixed to the pendulum. The first and/or second tilt sensors are preferably an accelerometer; a spring-mass system; and/or an arcuate resistive element. The first tilt sensor includes a tilt sensor that measures tilt in a first geometric plane, the pendulum is constrained to move in the first geometric plane, and the second tilt sensor is operable to measure tilt in the first geometric plane. The motion-sensing device or devices coupled to a machine, vehicle, and/or a control system. The substrate may include a portion of the first tilt sensor.

20 Claims, 7 Drawing Sheets

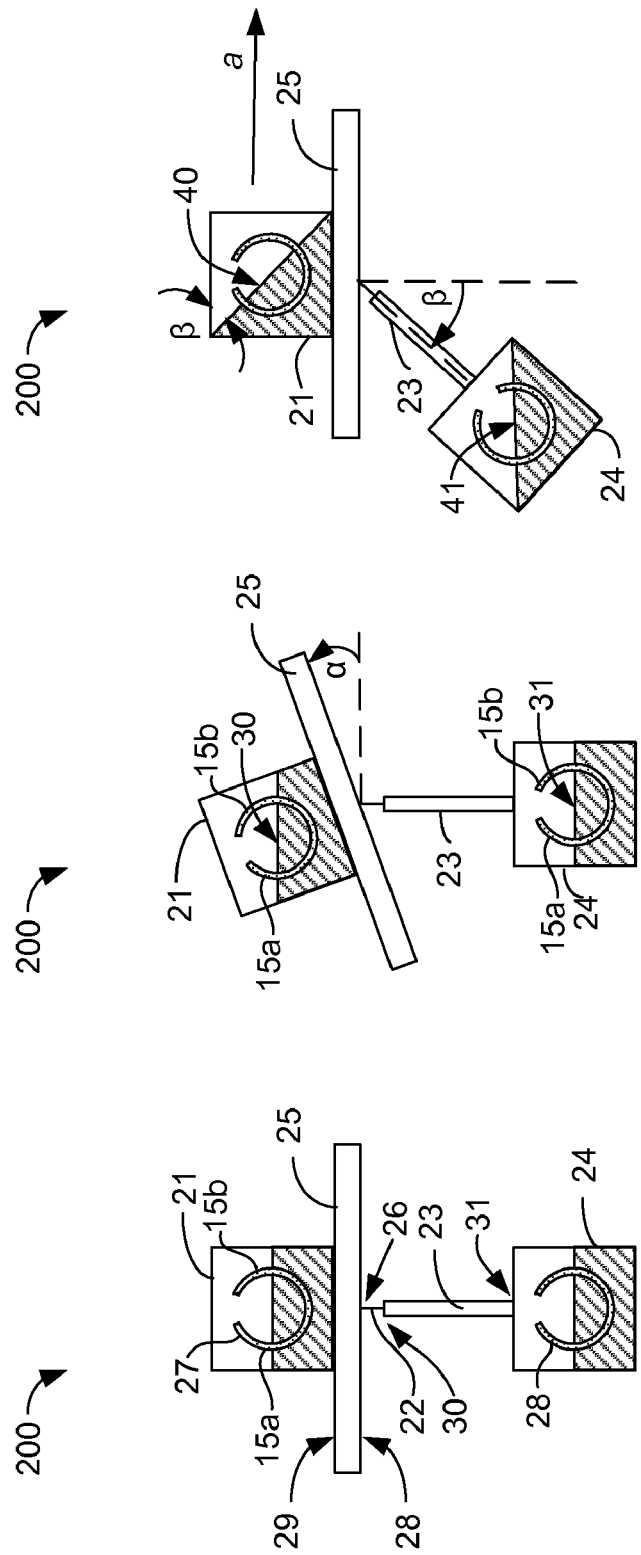

SENSOR AND METHOD FOR MOTION MEASUREMENT OF CO-EXISTING TILT AND HORIZONTAL ACCELERATION

FIELD OF THE INVENTION

This invention relates to a motion sensor for concurrent measurement variously of co-existing tilt and acceleration, for measurement of tilt alone, and for measurement of acceleration alone.

BACKGROUND OF THE INVENTION

There are many different designs of tilt sensors or angular sensors or inclinometers and accelerometers and some of them are already commercialized. It is a well known problem for available sensors that they can measure either tilt (inclination angle) or horizontal acceleration, but not both concurrently, because acceleration can generate a tilt signal in a tilt sensor:

$$\beta = \arctan(a/g) \quad (1)$$

where $\beta$ is the tilt angle, a is the horizontal linear acceleration and g is the gravitational acceleration. In the figures that follow, gravitational acceleration g is directed toward the bottom of the page. Likewise, tilt can generate a horizontal acceleration signal in an accelerometer.

In the case where both tilt and acceleration occur concurrently, however, legacy sensors cannot distinguish between tile and acceleration and, therefore, cannot measure the signal generated by tilt and the signal generated by acceleration separately in dynamic environment. For example, a tilt sensor or an accelerometer or both are mounted in a moving vehicle, which is a dynamic environment. It is very difficult to measure either tilt or acceleration because of interference from tilt with acceleration and interference of acceleration with tilt. Robert L. Forward designed a method to directly measure these two signals in separate forms. However, he further stated that this method was only academically correct. Yizi Xing calculated the tilt based on this method and found that realistic sensors do not have the necessary sensitivity of $10^{-8} \sim 10^{-7}$ meter/second$^2$ and, therefore, the horizontal linear acceleration and tilt cannot be distinguished practically. Robert L. Forward proposed another method to separate these two terms by measuring the resonant frequencies of the sensors and determine the tensor components. French, et al., also used resonant frequency to decrease the noise brought by the horizontal acceleration to measure gravitational field. Dosch, et al., calculated the gravitational field with better accuracy by accounting for undesired accelerations picked up by accelerometers having input axes that are not parallel to the gradiometer disc.

The remaining problem of how to accurately measure the tilt and horizontal acceleration in separate terms and at the same time, however, is yet to be resolved.

OBJECTS AND FEATURES OF THE INVENTION

A primary object and feature of the present invention is to overcome the above-mentioned problems and fulfill the above-mentioned needs. Another object and feature of the present invention is to provide a sensor that can sense tilt and acceleration whether occurring separately or concurrently. It is a further object and feature of the present invention to provide two such sensors in a fixed orthogonal spatial relationship to sense tilt and acceleration in two directions concurrently. It is a further object and feature of the present invention to provide a sensor structure that can incorporate various tilt sensors, including dedicated tilt sensors, accelerometers, spring-mass systems, and the like. It is a further object of the present invention to provide a tilt and acceleration sensor that can be coupled to a control system. It is a further object of the present invention to provide a tilt and acceleration sensor coupled to a control system that is coupled to a machine. It is a further object of the present invention to provide a tilt and acceleration sensor coupled to a control system that is coupled to a vehicle. It is a further object of the present invention to provide a tilt and acceleration sensor that may be implemented in various sizes, from MEMS to box-level motion sensing devices.

It is an additional primary object and feature of the present invention to provide such a system that is efficient, inexpensive and handy. Other objects and features of this invention will become apparent with reference to the following descriptions.

SUMMARY OF THE INVENTION

This invention uses a motion sensing device having at least two tilt sensors or two accelerometers or two springs or two different sensors from the group of tilt sensors, accelerometers, and springs, with at least one sensor mounted to a substrate and with at least one other sensor mounted firmly on the end part of a pendulum. The pendulum is hung on the substrate vertically and can rotate freely in a single geometric plane, preferably in a damping fluid in a gravitational field. As a result of being in free rotation, the arm of the pendulum is always parallel with the gravitational direction when the substrate is tilted if there is no additional linear acceleration. The first sensor or spring senses the mixed signals generated by both tilt and acceleration without distinguishing the two components. The second sensor or spring is able to only measure the horizontal acceleration without the interference from tilt. The tilt can be calculated from the difference of signals output from the first sensor and the second sensor. As a result, the motion, under the co-existing influences of both horizontal acceleration along the level direction and tilt along the gravitational direction, can be separated into two components, tilt and acceleration, respectively, and measured in the dynamic environment.

The present invention provides a motion-sensing device for sensing tilt and acceleration when either tilt, horizontal acceleration, or tilt and horizontal acceleration acting concurrently, influence the device, the device including: a substrate having a top and a bottom; a first tilt sensor fixed to the top of the substrate; a pendulum flexibly coupled to the bottom of the substrate; and a second tilt sensor fixed to the pendulum. The motion-sensing device, where the first and/or second tilt sensors includes: an accelerometer; a spring-mass system; and/or an arcuate resistive element. The motion-sensing device, where the first tilt sensor includes a tilt sensor operable to measure tilt in a first geometric plane; the pendulum is constrained to move in the first geometric plane; and the second tilt sensor includes a tilt sensor operable to measure tilt in the first geometric plane. The motion-sensing device, where the pendulum flexibly coupled to the bottom of the substrate is coupled to a point on the bottom of the substrate proximat the first tilt sensor. The motion-sensing device, including a first motion-sensing device, the first motion-sensing device having a fixed spatial relationship to a second motion-sensing device, where the second motion-sensing device measures tilt and acceleration in a second geometrical plane. The motion-sensing device, where the second geometric plane is orthogonal to the first geometrical plane. The motion-sensing device, coupled to a machine. The motion-sensing device, coupled to a control system. The motion-sensing device, where the control system is coupled to a vehicle. The motion-sensing device, where the substrate includes a portion of the first tilt sensor.

A motion-sensing device for sensing tilt and acceleration when tilt, horizontal acceleration, or tilt and horizontal acceleration acting concurrently, influence the device, the device including: a substrate having a top and a bottom; a first tilt sensor fixed to the top of the substrate; a pendulum flexibly coupled to the bottom of substrate; and a second tilt sensor fixed to the pendulum; and where at least one of the first and second tilt sensors includes at least one of: an accelerometer; a spring-mass system; and an arcuate resistive element. The motion-sensing device, where: the first tilt sensor includes a tilt sensor operable to measure tilt in a first geometric plane; the pendulum is constrained to move in the first geometric plane; and the second tilt sensor includes a tilt sensor operable to measure tilt in the first geometric plane. The motion-sensing device, where the pendulum flexibly coupled to the bottom of the substrate is coupled to a point on the bottom of the substrate on the first tilt sensor. The motion-sensing device, including a first motion-sensing device, the first motion-sensing device having a fixed spatial relationship to a second motion-sensing device, where the second motion-sensing device measures tilt and acceleration in a second geometrical plane. The motion-sensing device, where the second geometric plane is orthogonal to the first geometrical plane. The motion-sensing device, coupled to a machine. The motion-sensing device, coupled to a control system. The motion-sensing device, where the control system is coupled to a vehicle.

A motion-sensing device for sensing tilt and acceleration when tilt, horizontal acceleration, or tilt and horizontal acceleration act concurrently, influence the device, the device including: a substrate having a top and a bottom; a first tilt sensor fixed to the top of the substrate; a pendulum flexibly coupled to the bottom of substrate; and a second tilt sensor fixed to the pendulum; and where at least one of the first and second tilt sensors includes an accelerometer; a spring-mass system or an arcuate resistive element, and where the first tilt sensor includes a tilt sensor operable to measure tilt in a first geometric plane; the pendulum is constrained to move in the first geometric plane; and the second tilt sensor includes a tilt sensor operable to measure tilt in the first geometric plane. The motion-sensing device, including a first motion-sensing device, the first motion-sensing device having a fixed spatial relationship to a second motion-sensing device, where the second motion-sensing device measures tilt and acceleration in a second geometrical plane.

BRIEF DESCRIPTION OF THE DRAWINGS

The foregoing and other features of the invention may become more apparent when the following description is read together with drawings, in which:

FIG. 2 is a side view illustrating a first exemplary embodiment of the motion-sensing device having two tilt sensors without influence from either tilt or horizontal acceleration, according to a preferred embodiment of the present invention; One tilt sensor is mounted on a substrate and another tilt sensor is mounted firmly on the end part of a pendulum that is attached to a central point of the bottom of the substrate. The pendulum system is immersed in a damping fluid (not shown)

FIG. 3 is a side view illustrating the exemplary embodiment of the motion-sensing device of FIG. 2 having two tilt sensors under the influence of tilt but not acceleration, according to a preferred embodiment of the present invention;

FIG. 4 is a side view illustrating an exemplary embodiment of the motion-sensing device of FIG. 2 having two tilt sensors under the influence of acceleration but not tilt, according to a preferred embodiment of the present invention;

DESCRIPTION OF THE INVENTION

In the following description, references used in the figures are indicated in bold. Gravity, indicated as "g" in the equations, acts toward the bottom of the page in the illustrations.

Figure 1:
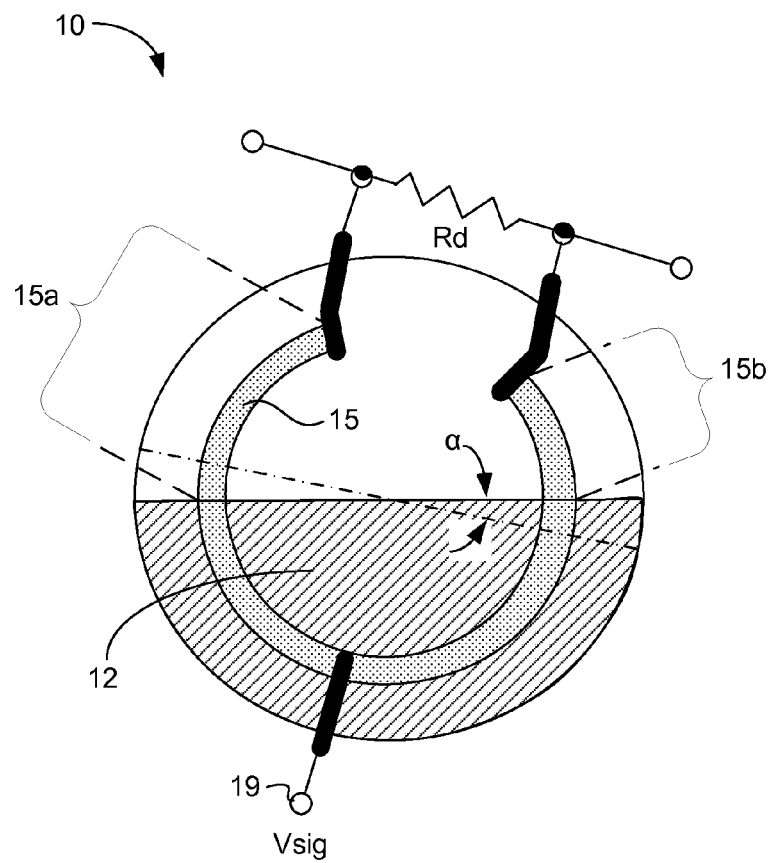
FIG. 1 is a view of a prior art tilt sensor as shown in U.S. Pat. No. 6,282,804.

FIG. 1 is a view of a prior art tilt sensor 10 as shown in U.S. Pat. No. 6,282,804 to the present inventor, which is incorporated herein in its entirety by reference. The tilt sensor 10 has an electrolytic fluid 12 and resistive element 15 including dry curve lengths 15a and 15b, which are more resistive than the portion of resistive element 15 that is wetted by electrolytic fluid 12. Resistive element 15 is preferably a section of a circle. Arcuate resistive element 15 is imprinted on a ceramic substrate, and so is substantially within a single geometric plane. This sensor 10 can accurately and linearly measure tilt angle α. The tilt angle α output from the sensor 10 is proportional to the difference of the dry curve lengths 15a and 15b of the resistive element 15. When tilt sensor 10 is not tilted, the lengths of 15a and 15b are equal, making the resistances of 15a and 15b equal, and creating a zero-tilt indication at output terminal 14.

FIG. 2 is a side view illustrating a first exemplary embodiment of the motion-sensing device 200 having two tilt sensors 21 and 24 without influence from either tilt or horizontal acceleration, according to a preferred embodiment of the present invention. A first tilt sensor 21 is mounted on the top 29 of a substrate 25 and a second tilt sensor 24 is fixed on a distal end 31 of a pendulum rod 23 that is attached via a flexible coupling 22 on a proximal end 30 to a central point 26 on the bottom 28 of the substrate 25. The pendulum system (22, 23 and 24) is immersed in a damping fluid (not shown). FIG. 2 shows the configuration of the invented motion-sensing device 200 in a quiescent state (no tilt and no acceleration). First and second tilt sensors 21 and 24 are the same type of sensors as tilt sensor 10 in FIG. 1. Resistive element 27 is the same as resistive element 15 in FIG. 1.

Tilt sensor 21 is fixed on solid substrate 25. The substrate 25 preferably does not change physical shape under the influence of tilt and acceleration. Pendulum flexible coupling 22 may be a short thin string or wire and attached to the central point 26 of the bottom of the substrate 25 and attached to a proximal end 30 of a pendulum rod 23. Central point 26 of the substrate 25 is aligned to the center of first tilt sensor 21, e.g., in the plane of resistive element 27 and on a line defining a vertical centerline of resistive element 27. Central point 26 is the point about which tilt is measured. The pendulum rod 23 functions as a pendulum, together with the mass of the second tilt sensor 24. The second tilt sensor 24 is fixed to the distal end of the rod 23. The total weight of rod 23 and second tilt sensor 24 is preferably much heavier than the string 22. In the quiescent state, the resistive elements 15a and 15b of both first tilt sensor 21 and second tilt sensor 24 have the same length and the resistance difference is zero. Therefore, the first and second tilt sensor 21 and 24 outputs are zero. The pendulum system comprising flexible coupling 22, pendulum rod 23, and second tilt sensor 24 is constrained to motion in a single plane, which is the plane of resistive element 27 in first tilt sensor 21 and resistive element 28 in second tilt sensor 24.

Multiple motion-sensing devices 200 may be used together to sense motion in multiple planes. In a preferred embodiment, two motion-sensing devices 200 are placed in a fixed spatial relationship in which the geometric planes in which motion-sensing devices 200 measure tilt and acceleration are orthogonal planes. In another preferred embodiment, more than two motion-sensing devices 200 are placed in a fixed spatial relationship in which the geometric planes in which two motion-sensing devices 200 measure tilt and acceleration are orthogonal planes and additional motion-sensing devices 200 are redundant or used for two-out-of-three or three-out-of-five voting logics, or the like.

FIG. 3 is a side view illustrating the exemplary embodiment of the motion-sensing device 200 of FIG. 2 having first and second tilt sensors 21 and 24 under the influence of tilt but not acceleration, according to a preferred embodiment of the present invention. FIG. 3 shows the substrate 25 tilted by tilt angle α without influence from acceleration. The tilt sensor 21 tilts with the same tilt angle α as the substrate 25. The level of the electrolytic fluid surface 30 is still horizontal. The difference in resistance of resistive elements 15a and 15b of tilt sensor 21 generates the tilt signal output Vsig at terminal 19 (FIG. 1). Therefore, the output of the first tilt sensor 21 is:

$$\text{Output}_{21} = \alpha \text{ under tilt} \quad (2)$$

where α is the tilt angle. However, the second tilt sensor 24 still maintains a quiescent status and the level of the electrolytic fluid surface 31 is still horizontal because the pendulum rod 23 will always point along the vertical gravitational direction if there is only a tilt influence on the whole system and no other forces or accelerations acting on the system. As a result, the difference of resistive elements 15a and 15b of second tilt sensor 24 is zero and the signal output is, therefore, zero too. Therefore, the output of the second tilt sensor 24 is not sensitive to tilt:

$$\text{Output}_{24} = 0 \text{ under tilt} \quad (3)$$

FIG. 4 is a side view illustrating an exemplary embodiment of the motion-sensing device 200 of FIG. 2 having first and second tilt sensors 21 and 24 under the influence of horizontal linear acceleration a but not tilt or any other forces, according to a preferred embodiment of the present invention. The level of the electrolytic fluid surface 40 in first tilt sensor 21 is changed to a slope. The first tilt sensor 21 will generate a fault tilt output β for this pure acceleration influence even though the substrate 25 has no tilt at all:

$$\text{Output}_{21} = \beta = \arctan(a/g) \text{ under acceleration} \quad (4)$$

as shown in Eq. (1). In the same time, under the influence of horizontal linear acceleration a, the pendulum system (22, 23, and 24) swings to an angle away from the vertical direction also expressed as β=arctan(a/g). By taking into account of the fact that the electrolytic fluid surface 41 of tilt sensor 24 is still keeping horizontal, the second tilt sensor 24 outputs a tilt signal:

$$\text{Output}_{24} = -\beta = -\arctan(a/g) \text{ under acceleration} \quad (5)$$

where second tilt sensor 24 output has an opposite sign compared to the output of first tilt sensor 21 because the electrolytic fluid surface 40 of the first tilt sensor 21 tilts to an angle without tilting the first tilt sensor 21 itself, while the tilt in second tilt sensor 24 is in fact brought by the tilt of the sensor body 24 and the electrolytic fluid surface 41 within the tilt sensor 24 is still on the horizontal plane. Thus, the angles are equal and opposite. It should be obvious to those of skill in the art, enlightened by the present disclosure, that the length of pendulum arm 23 and the extent of substrate 25 may place a limit on the maximum acceleration sensed, as a collision between the second tilt sensor 24 and the substrate 25 may occur at very high accelerations.

Figure 11A:
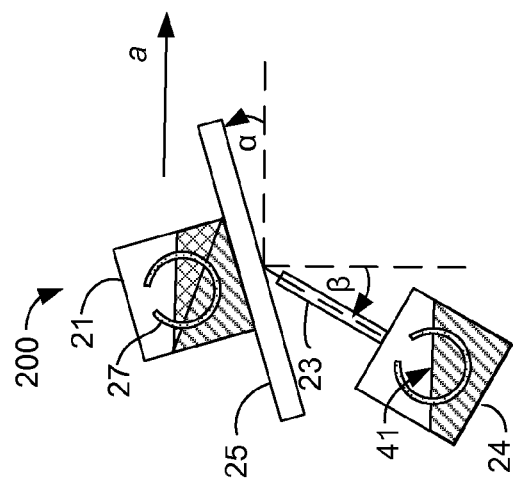
FIG. 11A is the side view illustrating an exemplary embodiment of the motion-sensing device of FIG. 2 having two tilt sensors concurrently under the influence of tilt and acceleration, according to a preferred embodiment of the present invention.

FIG. 11A is the side view illustrating an exemplary embodiment of the motion-sensing device 200 of FIG. 2 having first and second tilt sensors 21 and 24 concurrently under the influence of tilt and acceleration, according to a preferred embodiment of the present invention. The dynamic environment is assumed to build up in two steps in this sequence:

(a) first apply tilt as shown in FIG. 3;
(b) then apply the acceleration along the horizontal direction as shown in FIG. 4. From Eqs. (3) and (4) the horizontal acceleration a can be measured according to:

$$\text{Output}_{24}=-\beta \text{ and } a=g\tan(\beta) \text{ under both tilt and horizontal acceleration} \quad (6)$$

$$\text{Output}_{21}=\alpha+\beta \text{ under both tilt and horizontal acceleration} \quad (7)$$

where α is the tilt angle caused by a real tilt and β is the fault tilt angle caused by a horizontal acceleration a. As a result, the tilt angle can be calculated as:

$$\text{Tilt}=\text{Outpu}_{21}+\text{Output}_{24}=\alpha \text{ under both tilt and horizontal acceleration} \quad (8)$$

From Eq. (6) the horizontal acceleration can be directly measured based on second tilt sensor 24 separate from the tilt. From Eq. (8) the tilt angle α can be directly measured based on the difference of outputs from first tilt sensor 21 and second tilt sensor 24 and separated from the acceleration a. Note that equations (6), (7), and (8) are also valid in the cases of acceleration only, tilt only, and quiescent state.

Figure 11B:
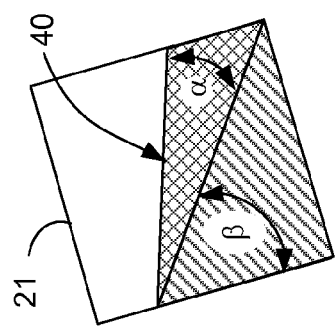
FIG. 11B is the side view illustrating a detail of an exemplary embodiment of the motion-sensing device of FIG. 2 having a second tilt sensor concurrently under the influence of tilt and acceleration, according to a preferred embodiment of the present invention.

FIG. 11B is the side view illustrating a detail of an exemplary embodiment of the motion-sensing device 200 of FIG. 11A having first tilt sensor 21 concurrently under the influence of tilt and acceleration, according to a preferred embodiment of the present invention. FIG. 11B shows the contributions of fault tilt signal β and tilt angle α to the position of electrolytic fluid surface 40 under the influence of tilt and acceleration in first tilt sensor 21.

Figure 5:
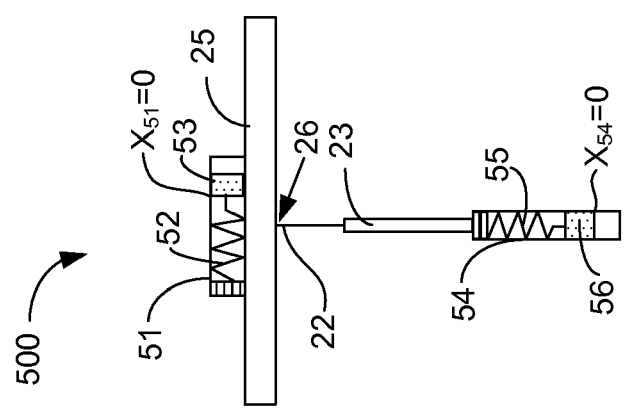
FIG. 5 is a side view illustrating a second exemplary embodiment of the motion-sensing device without influence from either tilt or horizontal acceleration, according to a preferred embodiment of the present invention.

FIG. 5 is a side view illustrating a second exemplary embodiment of the motion-sensing device 500 without influence from either tilt or horizontal acceleration, according to a preferred embodiment of the present invention. A first spring-mass system 51, operable as a tilt sensor, is mounted on a substrate 25 and a second spring-mass system 54, also operable as a tilt sensor, is fixed to the distal end of a pendulum rod 23 that is attached to a central point 26 of the bottom of the substrate 25. The pendulum system (22, 23 and 54) is immersed in a damping fluid (not shown). FIG. 5 shows the configuration of the spring-mass motion-sensing device 500 in a quiescent state. First spring-mass system 51 having a spring 52 having spring constant k and a mass 53 having mass m is fixed to a solid substrate 25. The mass 53 is constrained to move along a single axis. The second spring-mass system 54 with a spring 55 having the same spring constant k and mass 56 having the same mass m is mounted on the distal end of the pendulum rod 23. The total weight of pendulum rod 23 and the second spring-mass system 54 is preferably much heavier than the flexible coupling 22. The relationship of spring force F and the displacement X of the free end of the spring 52 or 55 from its equilibrium position is F=−kX. The displacement $X_{51}$, being the displacement of spring-mass system 51, is shown as the displacement of the free end of spring 52 but may also be measured as the displacement of mass 53, to which the free end of spring 52 is attached. Likewise, displacement $X_{54}$, being the displacement of spring-mass system 54, is shown as the displacement of the free end of spring 54 but may also be measured as the displacement of mass 56, to which the free end of spring 55 is attached. In a quiescent state, the displacements of first spring-mass system 51 and second spring-mass system 54 are:

$$X_{51}=0 \text{ and } X_{54}=mg/k \text{ quiescent state} \quad (9)$$

Figure 6:
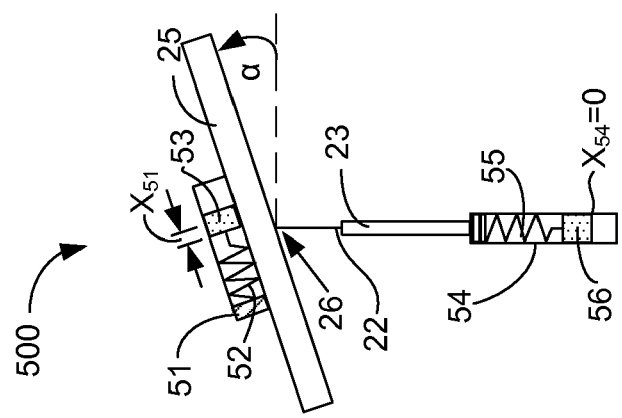
FIG. 6 is the side view illustrating an exemplary embodiment of the motion-sensing device of FIG. 5 having two spring-mass systems under the influence of tilt but not acceleration, according to a preferred embodiment of the present invention.

FIG. 6 is the side view illustrating an exemplary embodiment of the motion-sensing device 500 of FIG. 5 having first and second spring-mass systems 51 and 54 under the influence of tilt but not acceleration, according to a preferred embodiment of the present invention. FIG. 6 shows the substrate 25 tilted and without influence of acceleration. The first spring-mass system 51 tilts with the same tilt angle α as the substrate 25. The pendulant second spring-mass system 54 remains unmoved and in the same vertical direction with the pendulum rod 23 because the pendulum rod 23 does not swing away from the vertical gravitational field. The relationships of tilt and displacements of $X_{51}$ and $X_{54}$ can be expressed as:

$$X_{51}=-mg\sin(\alpha)/k \text{ and } X_{54}=mg/k \text{ under tilt} \quad (10)$$

where $X_{51}$ is the displacement of the spring 52 or the mass 53 and $X_{54}$ is the displacement of the spring 55 or the mass 56.

Figure 7:
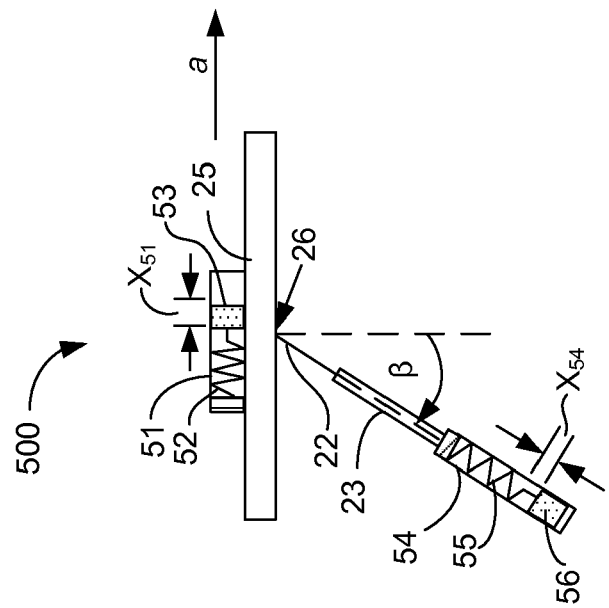
FIG. 7 is the side view illustrating an exemplary embodiment of the motion-sensing device of FIG. 5 having two springs under the influence of acceleration but not tilt, according to a preferred embodiment of the present invention.

FIG. 7 is the side view illustrating an exemplary embodiment of the motion-sensing device 500 of FIG. 5 having first and second spring-mass systems 51 and 54 under the influence of horizontal linear acceleration a but not tilt, according to a preferred embodiment of the present invention. The relationship of the horizontal acceleration a and the displacement $X_{51}$ of spring-mass systems 51 is:

$$a=-kX_{51}/m \text{ under acceleration} \quad (11)$$

The pendulum system (22, 23, and 54) swings to an angle β also expressed as β=arctan(a/g) away from the vertical direction under influence of the acceleration. The relationship of the horizontal linear acceleration a and the displacement $X_{54}$ of spring 55 and mass 56 of spring-mass system 54 is:

$$a=+/-[(k/m)^2 X_{54}^2 - g^2]^{1/2} \text{ under acceleration} \quad (12)$$

The horizontal acceleration a causes the pendulum to swing to a certain angle $$\beta=\arctan(a/g) \text{ under acceleration} \quad (13)$$

Figure 12:
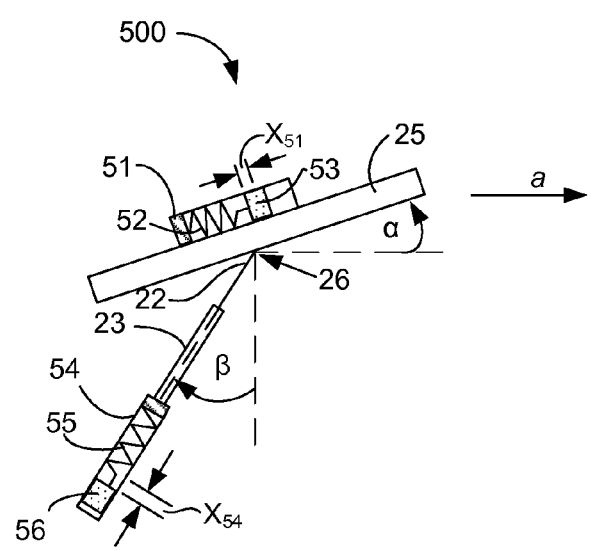
FIG. 12 is the side view illustrating an exemplary embodiment of the motion-sensing device of FIG. 5 having two spring-mass systems concurrently under the influence of tilt and acceleration, according to a preferred embodiment of the present invention.

FIG. 12 shows the whole system 500 under influence of both tilt α and horizontal acceleration a. Second spring-mass system 54 is not sensitive to tilt α and the acceleration a can be measured via:

$$a=+/-[(k/m)^2 X_{54}^2 - g^2]^{1/2} \text{ under both tilt and horizontal acceleration} \quad (14)$$

Again, the horizontal acceleration a causes the pendulum system (22, 23, and 54) to swing to a certain angle:

$$\beta=\arctan(a/g) \text{ under both tilt and horizontal acceleration} \quad (15)$$

The relationship between the acceleration a, the tilt α, and the displacement $X_{51}$ of spring 52 and mass 56 of spring-mass system 54 is express as:

$$-kX_{51}=m[a\cos(\alpha)+g\sin(\alpha)]=m(a^2+g^2)^{1/2}\sin(\beta+\alpha) \text{ under tilt and horizontal acceleration} \quad (16)$$

Or $$\beta+\alpha=-\arcsin[kX_{51}/m/(a^2+g^2)^{1/2}] \text{ under tilt and horizontal acceleration} \quad (17)$$

As a result, the tilt angle α is:

$$\alpha=\arcsin[-kX_{51}/m/(a^2+g^2)^{1/2}]-\beta \text{ under tilt and horizontal acceleration} \quad (18)$$

Again, with equations (14), (15) and (18), the tilt α and horizontal acceleration a can be measured directly and independently when these two dynamic forces act concurrently.

Figure 10:
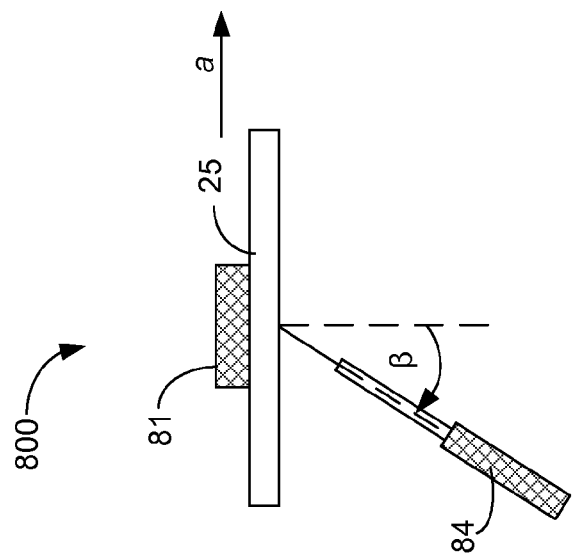
FIG. 10 is the side view illustrating an exemplary embodiment of the motion-sensing device of FIG. 8 having two accelerometers under the influence of acceleration but not of tilt, according to a preferred embodiment of the present invention.
Figure 9:
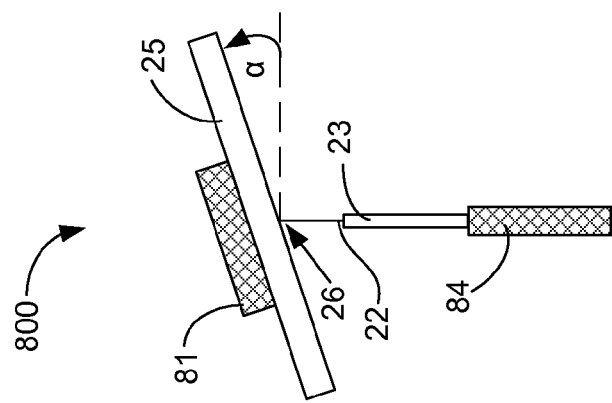
FIG. 9 is the side view illustrating an exemplary embodiment of the motion-sensing device of FIG. 8 having two accelerometers under the influence of tilt but not acceleration, according to a preferred embodiment of the present invention.
Figure 8:
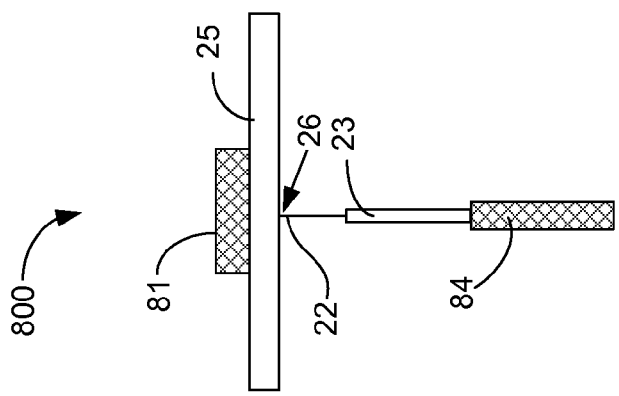
FIG. 8 is a side view illustrating an exemplary embodiment of the motion-sensing device without influence from both tilt and horizontal acceleration, according to a preferred embodiment of the present invention; One accelerometer mounted on a substrate and another accelerometer is mounted on the end part of a pendulum that is attached to a central point of the bottom of the substrate. The pendulum system is immersed in a damping fluid (not shown).

In an alternate preferred embodiment of motion-sensing device 800, first and second tilt sensors 21 and 24 in FIGS. 2, 3, and 4 may be replaced with first and second accelerometers 81 and 84, respectively, because accelerometers 81 and 84 can also be used to measure tilt. The alternate preferred embodiment 800 is shown in FIGS. 8, 9, and 10. First and second accelerometers 81 and 84 produce signal outputs that are linear with tilt and acceleration, allowing the use of equations (6) and (8) to determine tilt angle α and horizontal acceleration a. It should be obvious to those of skill in the art, enlightened by the present disclosure, that any device capable of measuring acceleration, regardless of complexity, may be used to measure tilt and so may be used as first and second accelerometers 81 and 84. The scope of the present invention encompasses all the various devices that may be used as tilt sensors.

One can use the motion-sensing device 200 with the configuration shown in FIGS. 2, 3, and 4 to measure acceleration a and tilt angle α when tilt and acceleration act concurrently on the motion-sensing device 200. One can use the motion-sensing device 800 with the configuration shown in FIGS. 8, 9 and 10 to measure acceleration a and tilt α when the tilt and acceleration act concurrently on the motion-sensing device 800. The motion-sensing device 500 with the configuration shown in FIGS. 5, 6, and 7 can be used in a manner similar to motion-sensing devices 200 and 800, and further used as a basic mechanism to design a micro-electro-mechanical system (MEMS) as a single IC chip to measure acceleration and tilt with tilt and acceleration acting concurrently.

The sensing elements in the above configurations are not necessarily of the same type in one motion-sensing device 200, 500, or 800. For example, either one of the first and second tilt sensors 21 and 24 in the configuration as shown in FIG. 2, FIG. 3 and FIG. 4 is interchangeable with either first or second spring-mass system 51 and 54 or a first or second accelerometer 81 and 84, requiring only slight modifications to the wiring. Pendulum systems (22, 23, and 24 or 54 or 84) are likewise interchangeable, with less modification to the wiring required. The wiring methods for such devices as 200, 500, and 800 are well known in the art.

Figure 13:
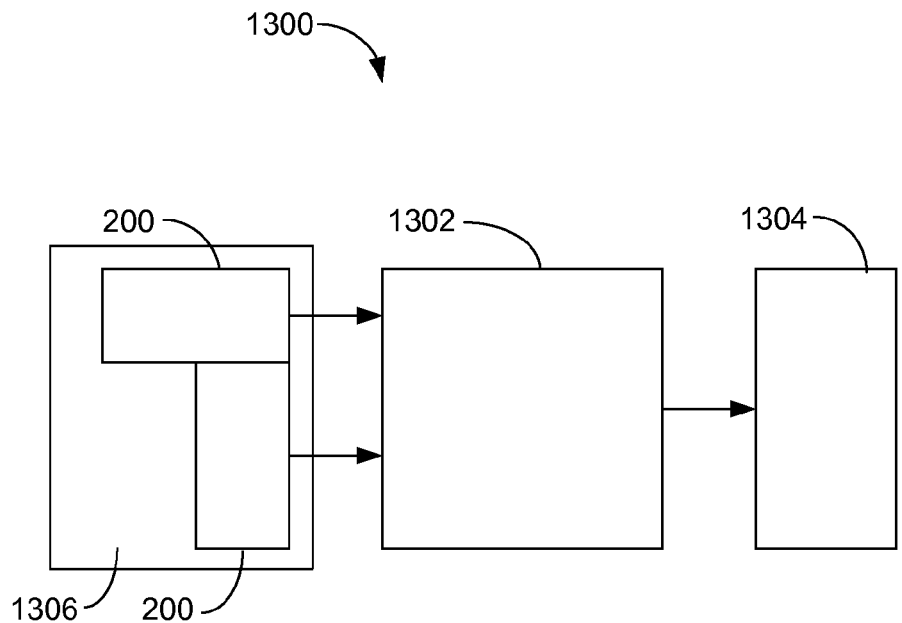
FIG. 13 is a diagrammatic view illustrating two motion-sensing devices oriented orthogonally and coupled to control system to provide inputs to control system, according to a preferred embodiment of the present invention.

FIG. 13 is a diagrammatic view illustrating two motion-sensing devices 200 oriented orthogonally and coupled to control system 1302 to provide inputs to control system 1302. Any of the motion-sensing devices 500, 800, and others described above may be substituted for motion-sensing devices 200. Because each motion sensing device 200 senses acceleration and tilt in only one geometric plane, an orthogonal pair can be used to sense acceleration and tilt in two dimensions. A base 1306 allows the two motion-sensing devices 200 to be maintained in a fixed spatial relationship by virtue of being fixed to the base 1306. Control system may have additional inputs (not shown) such as a position sensor based on GPS technology. An initial position fix could then lead, by integrating the horizontal accelerations, to further position information where GPS signals are not reliably available, as in cities having many tall buildings. The control system 1302 has outputs to actuators 1304, which are operable to implement control commands or provide links to a human operator.

Figure 14:
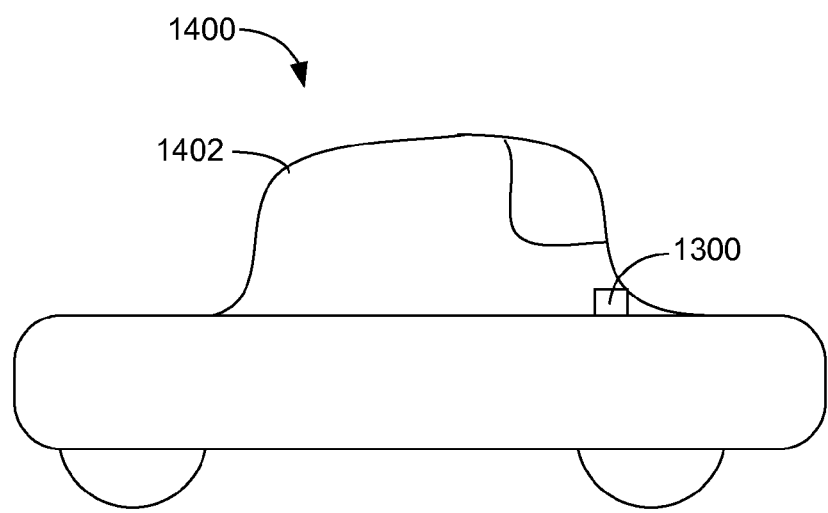
FIG. 14 is a diagrammatic view of a vehicle illustrating an exemplary embodiment of a control system coupled to a machine, particularly a vehicle, according to a preferred embodiment of the present invention.

FIG. 14 is a diagrammatic view of a vehicle 1402 illustrating an exemplary embodiment 1400 of a control system 1300 coupled to a machine 1402, particularly a vehicle 1402. Machinery applications arise in robotics and navigation, among others. Vehicle applications are not limited to navigation, nor are the vehicles 1402 used limited to land vehicles.

Although applicant has described applicant's preferred embodiments of this invention, it will be understood that the broadest scope of this invention includes such modifications as diverse materials and diverse tilt sensors. Such scope is limited only by the below claims as read in connection with the above specification. Further, many other advantages of applicant's invention will be apparent to those skilled in the art, once enlightened by the above descriptions and the below claims.

I claim:

1. A motion-sensing device for sensing tilt and acceleration when one of tilt, horizontal acceleration, and tilt and horizontal acceleration acting concurrently, influence said device, the device comprising:
   a. a substrate having a top and a bottom;
   b. a first tilt sensor fixed to said top of said substrate;
   c. a pendulum flexibly coupled to said bottom of said substrate; and
   d. a second tilt sensor fixed to said pendulum.

2. The motion-sensing device of claim 1, wherein at least one of said first and second tilt sensors comprises at least one of:
   a. an accelerometer;
   b. a spring-mass system; and
   c. an arcuate resistive element.

3. The motion-sensing device of claim 1, wherein:
   a. said first tilt sensor comprises a tilt sensor operable to measure tilt in a first geometric plane;
   b. said pendulum is constrained to move in said first geometric plane;
   c. and said second tilt sensor comprises a tilt sensor operable to measure tilt in said first geometric plane.

4. The motion-sensing device of claim 3, wherein said pendulum flexibly coupled to said bottom of said substrate is coupled to a point on said bottom of said substrate proximate said first tilt sensor.

5. The motion-sensing device of claim 3, comprising a first motion-sensing device, said first motion-sensing device having a fixed spatial relationship to a second motion-sensing device of claim 3, wherein said second motion-sensing device measures tilt and acceleration in a second geometrical plane.

6. The motion-sensing device of claim 5, wherein said second geometric plane is orthogonal to said first geometrical plane.

7. The motion-sensing device of claim 1, coupled to a machine.

8. The motion-sensing device of claim 1, coupled to a control system.

9. The motion-sensing device of claim 8, wherein said control system is coupled to a vehicle.

10. The motion-sensing device of claim 1, wherein said substrate comprises a portion of said first tilt sensor.

11. A motion-sensing device for sensing tilt and acceleration when one of tilt, horizontal acceleration, and tilt and horizontal acceleration acting concurrently, influence said device, the device comprising:
   a. a substrate having a top and a bottom;
   b. a first tilt sensor fixed to said top of said substrate;
   c. a pendulum flexibly coupled to said bottom of substrate; and
   d. a second tilt sensor fixed to said pendulum; and wherein at least one of said first and second tilt sensors comprises at least one of:
   a. an accelerometer;
   b. a spring-mass system; and
   c. an arcuate resistive element.

12. The motion-sensing device of claim 11, wherein:
   a. said first tilt sensor comprises a tilt sensor operable to measure tilt in a first geometric plane;
   b. said pendulum is constrained to move in said first geometric plane;
   c. and said second tilt sensor comprises a tilt sensor operable to measure tilt in said first geometric plane.

13. The motion-sensing device of claim 12, wherein said pendulum flexibly coupled to said bottom of said substrate is coupled to a point on said bottom of said substrate proximate said first tilt sensor.

14. The motion-sensing device of claim 11, comprising a first motion-sensing device, said first motion-sensing device having a fixed spatial relationship to a second motion-sensing device of claim 11, wherein said second motion-sensing device measures tilt and acceleration in a second geometrical plane.

15. The motion-sensing device of claim 14, wherein said second geometric plane is orthogonal to said first geometrical plane.

16. The motion-sensing device of claim 11, coupled to a machine.

17. The motion-sensing device of claim 11, coupled to a control system.

18. The motion-sensing device of claim 17, wherein said control system is coupled to a vehicle.

19. A motion-sensing device for sensing tilt and acceleration when one of tilt, horizontal acceleration, and tilt and horizontal acceleration acting concurrently, influence said device, the device comprising:
   a. a substrate having a top and a bottom;
   b. a first tilt sensor fixed to said top of said substrate;
   c. a pendulum flexibly coupled to said bottom of substrate; and
   d. a second tilt sensor fixed to said pendulum; and
wherein at least one of said first and second tilt sensors comprises at least one of:
   a. an accelerometer;
   b. a spring-mass system; and
   c. an arcuate resistive element, and
wherein:
   a. said first tilt sensor comprises a tilt sensor operable to measure tilt in a first geometric plane;
   b. said pendulum is constrained to move in said first geometric plane;
   c. and said second tilt sensor comprises a tilt sensor operable to measure tilt in said first geometric plane.

20. The motion-sensing device of claim 19, comprising a first motion-sensing device, said first motion-sensing device having a fixed spatial relationship to a second motion-sensing device of claim 19, wherein said second motion-sensing device measures tilt and acceleration in a second geometrical plane.

* * * * *